US011727107B1

(12) United States Patent
Cancilla

(10) Patent No.: US 11,727,107 B1
(45) Date of Patent: Aug. 15, 2023

(54) MACHINE SCANNING SYSTEM WITH DISTRIBUTED CREDENTIAL STORAGE

(71) Applicant: Rapid7, Inc., Boston, MA (US)

(72) Inventor: James Edward Cancilla, Milton (CA)

(73) Assignee: Rapid7 Inc., Boston, MA (US)

( * ) Notice: Subject to any disclaimer, the term of this patent is extended or adjusted under 35 U.S.C. 154(b) by 57 days.

(21) Appl. No.: 17/540,070

(22) Filed: Dec. 1, 2021

Related U.S. Application Data

(63) Continuation of application No. 16/874,577, filed on May 14, 2020, now Pat. No. 11,216,553.

(51) Int. Cl.
| | |
|---|---|
| *G06F 21/45* | (2013.01) |
| *H04L 9/32* | (2006.01) |
| *H04L 9/08* | (2006.01) |

(52) U.S. Cl.
CPC ............ *G06F 21/45* (2013.01); *H04L 9/0825* (2013.01); *H04L 9/0897* (2013.01); *H04L 9/3226* (2013.01)

(58) Field of Classification Search
CPC ..... G06F 21/45; H04L 9/0825; H04L 9/0897; H04L 9/3226; H04L 63/20; H04L 63/083; H04L 63/1425; H04L 63/1408; H04L 63/1433; H04L 63/1416; H04L 67/125; H04W 4/38
See application file for complete search history.

(56) References Cited

U.S. PATENT DOCUMENTS

| | | | |
|---|---|---|---|
| 7,178,025 B2 | 2/2007 | Scheidt et al. | |
| 8,196,191 B2 * | 6/2012 | Norman ................ | H04L 9/3236 726/8 |
| 8,341,270 B2 | 12/2012 | Mazzaferri et al. | |
| 8,607,067 B1 * | 12/2013 | Janse van Rensburg et al. .......... | H04L 63/20 713/189 |
| 8,819,444 B2 | 8/2014 | Shahbazi et al. | |
| 9,703,965 B1 | 7/2017 | Robinson et al. | |
| 9,742,790 B2 | 8/2017 | Sood et al. | |
| 9,967,236 B1 | 5/2018 | Ashley et al. | |
| 10,469,457 B1 * | 11/2019 | Sokolov ................ | H04L 63/061 |
| 10,791,138 B1 | 9/2020 | Siddiqui et al. | |
| 11,102,193 B2 * | 8/2021 | Tempel ................ | H04L 63/062 |
| 2005/0171872 A1 * | 8/2005 | Burch ..................... | H04L 67/10 705/29 |

(Continued)

*Primary Examiner* — Techane Gergiso
(74) *Attorney, Agent, or Firm* — Ashwin Anand; Lei Sun

(57) ABSTRACT

Systems and methods are disclosed to implement a machine scanning system that stores machine access credentials in a distributed fashion in a pool of scanner nodes. In embodiments, a storage manager node is selected from the pool to manage the storage of each new credential. The storage manager partitions the credential into portions and distributes the portions among the nodes, which may store the portions under different encryptions. A credential storage metadata is updated to indicate portion assignments and also distributed. At scanning time, the node selected to perform the scan uses the credential storage metadata to gather the portions and reconstruct the credential. In embodiments, the portions may be assigned so that no single node holds all portions of the credential, and at least two nodes hold each portion. Advantageously, the disclosed storage scheme enhances the security and availability of access credentials used by the machine scanning system.

20 Claims, 12 Drawing Sheets

(56) References Cited

U.S. PATENT DOCUMENTS

| | | | |
|---|---|---|---|
| 2007/0220598 A1* | 9/2007 | Salowey | H04L 9/321 |
| | | | 726/10 |
| 2009/0077638 A1* | 3/2009 | Norman | G06F 21/33 |
| | | | 726/5 |
| 2014/0068734 A1 | 3/2014 | Arroyo et al. | |
| 2014/0196130 A1* | 7/2014 | Brooker | G06F 21/44 |
| | | | 726/6 |
| 2018/0007087 A1 | 1/2018 | Grady et al. | |
| 2018/0082256 A1 | 3/2018 | Tummuru et al. | |
| 2018/0373887 A1* | 12/2018 | Smith | G06F 21/6227 |
| 2019/0303600 A1 | 10/2019 | Hamel et al. | |
| 2019/0377886 A1* | 12/2019 | Roy | G06F 11/2094 |
| 2020/0137038 A1 | 4/2020 | Endler | |
| 2020/0186336 A1* | 6/2020 | Destefanis | H04L 9/3066 |

* cited by examiner

MACHINE SCANNING CONFIGURATION 600

MACHINE(S): server-01.company.com (11.122.33.55), server-02.company.com (11.122.33.48) 610

MACHINE SCANNING CREDENTIAL(S): 4 CREDENTIALS STORED 620

☒ PARTITION CREDENTIAL(S) ACROSS SCANNER NODES 630
☒ PARTITION CREDENTIALS INTO X PORTIONS, WHERE X IS NUMBER OF AVAILABLE SCANNER NODES
☐ RANDOMLY SHUFFLE BYTES BEFORE PARTITIONING
☒ STORE EACH PORTION REDUNDANTLY ON 2 NODES

CREDENTIAL(S) REPARTITIONING 640
☒ REPARTITION WHEN SCANNER NODE POOL MEMBERSHIP CHANGES
☐ REPARTITION PERIODICALLY
☒ REPARTITION UPON CONDITION(S): DETECTION OF ABNORMAL ACCESS

[ REPARTITION NOW 642 ]

*FIG. 6*

MACHINE SCANNING SYSTEM WITH DISTRIBUTED CREDENTIAL STORAGE

This application is a continuation of U.S. patent application Ser. No. 16/874,577, filed May 14, 2020, which is hereby incorporated by reference herein in its entirety.

BACKGROUND

A scan engine is a computer system used to scan machines of a computer network to perform tasks such as asset discovery, vulnerabilities detection, and policy compliance assessment. In an authenticated scan, the scan engine must authenticate with the target machine using an access credential (e.g. a user ID and password pair) in order to perform the scan of the target machine. Currently, such access credentials are usually stored in a centralized repository, and the scan engine will retrieve the credential from the repository prior to a scan. However, this centralize approach creates a number of problems for large-scale providers of machine or network scanning services. First, the centralized repository is a single point of failure in the network scanning system, preventing the provider from implementing the system as a highly available and scalable service. Second, the centralized repository represents a substantial security risk in that a compromise of the repository would result in the loss of a large number of access credentials for customer systems. These problems present significant challenges for current network scanning systems, and there is a general need in the field for improved solutions to store access credentials for these systems.

SUMMARY OF EMBODIMENTS

The systems and methods described herein are employed in various combinations and in embodiments to implement a machine scanning system that provides distributed storage of machine access credentials. In some embodiments, the machine scanning system partitions the credential(s) into portions, and distributes the portions among a pool of scanner nodes. When a new credential is received, a storage manager node is selected from the pool to partition and distribute the portions. The storage manager may also update a credential storage metadata to indicate the assignment of the portions, and distribute the credential storage metadata among the nodes. At scanning time, the node selected to perform the scan uses the credential storage metadata to gather the portions from other nodes and reconstructs the credential. In some embodiments, the portions are assigned so that no single node stores all portions of a credential, and at least two nodes store each portion. In this manner, the machine scanning system ensures that the credential is secure and highly available for use during operation of the system.

BRIEF DESCRIPTION OF THE DRAWINGS

FIG. 6 illustrates an example graphical user interface (GUI) that allows a user to configure aspects of distributed storage of credentials in a machine scanning system, according to some embodiments.

Figure 1:
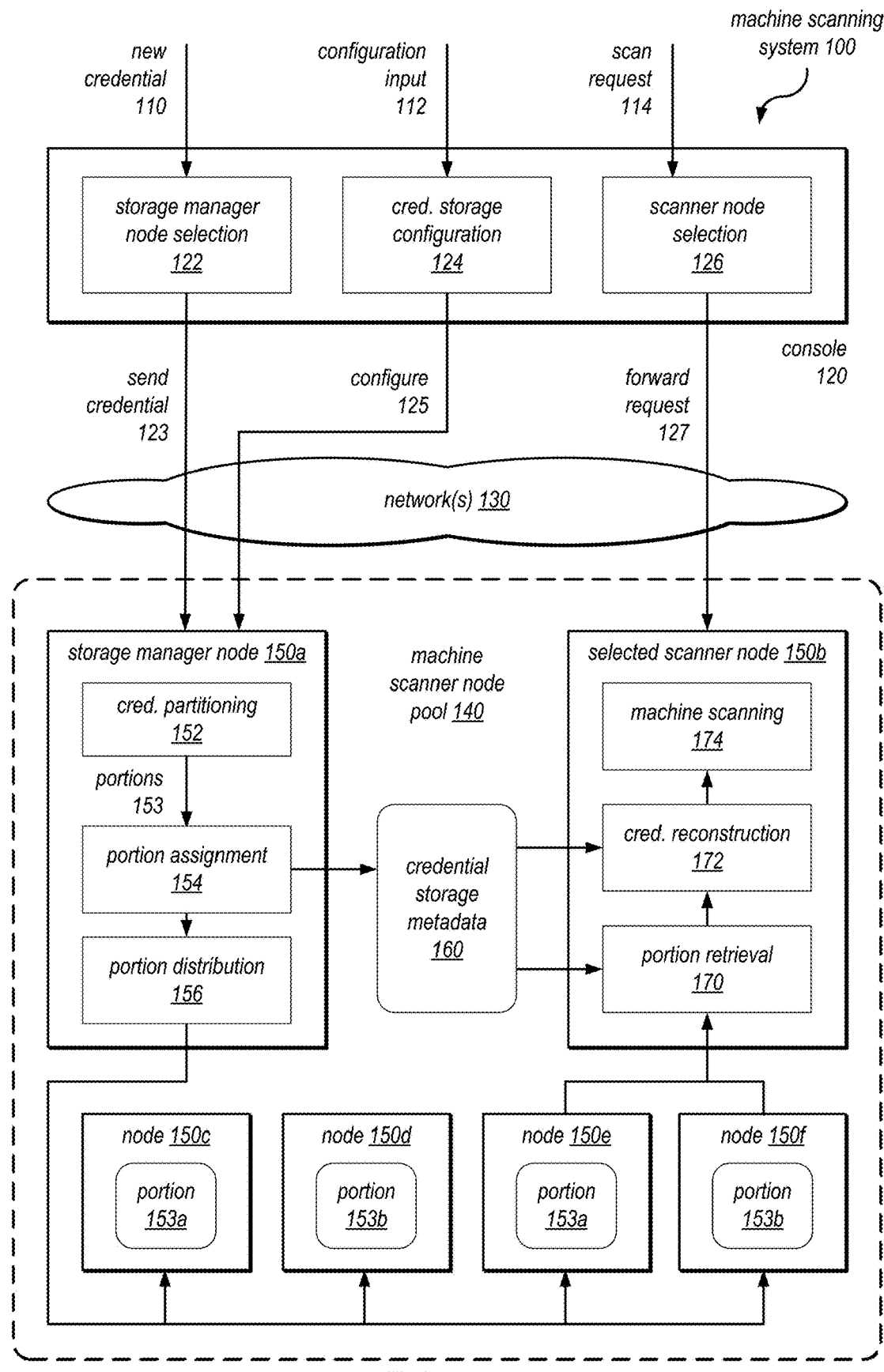
FIG. 1 is a block diagram that illustrates an example machine scanning system that implements distribute storage of machine access credentials, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

When an authenticated scan is performed on a target machine, a scan engine must authenticate with the target machine using an access credential (e.g. a user ID and password pair) to perform the scan of the target machine. Such access credentials are usually stored in a centralized repository, and the scan engine will retrieve the credential from the repository prior to a scan. However, the centralized repository creates a number of problems for large-scale providers of network scanning services that monitor many customer networks. First, the centralized repository is a single point of failure, preventing the provider from implementing the network scanning system as a highly available and scalable service. Second, the centralized repository represents a substantial security risk in that a compromise of the repository would result in the loss of a large number of access credentials for customer systems.

To address these and other problems with current machine scanning systems, embodiments of a machine scanning system disclosed herein implement a distributed credential store to store machine access credentials in a decentralized fashion among multiple machine scanner nodes of a scanner node group. In some embodiments, when a new credential is received by the machine scanning system, the credential is sent to a storage manager node selected from the group. The storage manager node will partition the credential into a number of portions, and distributed the portions to be stored by other nodes in the group. Because each scanner node only stores some portion(s) of the credential, a compromise of any one node does not compromise the entire credential. In some embodiments, a single portion may be stored redundantly on multiple scanner nodes, so that that the portion will be available to the system even when a particular node goes offline.

When the credential is needed for a machine scan, the selected scanner node will reconstruct the credential by gathering the portions from the other nodes in the group. In some embodiments, the portions are gathered according to a credential storage metadata built by the storage manager node and distributed to the other nodes. In some embodiments, the storage manager node may also compute a hash or checksum of the credential and include that value in the distributed credential storage metadata. The reconstructing node may then use this hash or checksum to verify that the credential is reconstructed correctly.

In some embodiments, each scanner node may possess a set of asymmetric keys (e.g. a public key that is distributed among the group and a retained private key). The asymmetric keys may be used to securely transmit the portions among the nodes. For example, to distribute a portion to a receiving node, a storage manager node may encrypt the portion with the receiving node's public key, so that the receiving node can decrypt the portion with its private key. Similarly, when the portion is provided for a reconstruction, the sending node may first encrypt the requested portion, which is then decrypted by the requesting node. In some embodiments, each node may store its portion(s) under a different encryption. In some embodiments, the asymmetric keys for nodes in the group may be rotated periodically and shared among the nodes under a key sharing protocol.

In some embodiments, the storage manager node may divide a credential into a number of portions that is equal to the number of member nodes in the group. In some embodiments, more or less portions may be generated for a credential based on configuration information specified by the user. In some embodiments, the portions may be assigned to the nodes of the group in a pseudorandom manner. In some embodiments, the portions may be assigned according to configuration information (e.g. a distribution policy). For example, a distribution policy may specify that only a subset of nodes in the group will receive portions of a credential for a machine (e.g. those nodes that actually perform scans on that machine).

In some embodiments, the machine scanning system may store a list of multiple machine access credentials together in a binary object (e.g. a byte array), and the entire binary object or byte array will be partitioned and distributed among the nodes. Accordingly, when a new credential is added to or removed from the system, the storage manager node will first gather the portions to reconstruct the list, modify the list, and then repartition and redistribute portions of a new binary object or byte array representing the modified list. By combining many credentials into a single binary object, less storage metadata is needed to keep track of the storage of credentials.

In some embodiments where the credential is a user ID/password pair, the machine scanning system may perform the partitioning so that the user ID and the password are stored in two distinct portions (or sets of portions). This feature ensures that no portion contains information about both the user ID and the password, and enhances the security of the storage scheme. In some embodiments where multiple credentials are encoded as a byte array, the machine scanning system may partition the byte array so that each constituent credential is divided into multiple portion. In some embodiments, the partitioning scheme may be performed so that no portion contains a set of continuous bytes in the original byte array. In some embodiments, the assignment of bytes into the portions may be performed using a randomization process (e.g. by first shuffling the bytes in the array based on a random seed). The randomization process will be reversed when the byte array is reconstructed (e.g. using the random seed distributed as part of the credential storage metadata).

In some embodiments, the machine scanning system may automatically repartition and redistribute the portions of the credential(s) based on the detection of runtime conditions. For example, the system may repartition a credential when membership of the node group changes. For example, when an existing node goes offline (e.g. when it fails to provide an expected heartbeat to other nodes), a repartitioning process will be performed to redistribute the credentials among the remaining nodes. As another example, a repartitioning may be performed based on a detection that an abnormal access of a monitored machine has occurred. As yet another example, a repartitioning may be performed regularly according to a set schedule (e.g. once every week).

As will be appreciated by those skilled in the art, the disclosed features provide numerous technical improvements to the way access credentials are stored in machine scanning systems. The decentralized storage scheme improves security of existing systems that use a centralized repository. The storage scheme can be made to store credentials with high availability by storing the portions redundantly on multiple nodes. The disclosed scheme moves the source of truth away from the centralized repository onto the scanner nodes themselves, so as to remove an external dependency from the scanner nodes. The removal of the dependency allows the nodes to be more self-contained (e.g. operate more autonomously within a client network) and improves the overall reliability of the machine scanning system. These and other features and benefits of the disclosed machine scanning system are described in further detail below, in connection with the figures.

FIG. 1 is a block diagram that illustrates an example machine scanning system that implements distribute storage of machine access credentials, according to some embodiments.

As shown in this example, the depicted machine scanning system 100 includes a console 120 and a pool 140 of machine scanner nodes that can communicate over a computer network 130. Network(s) 130 may be any suitable network for conducting computer-to-computer communications, including local area networks, wide area networks, private networks, and public networks such as the Internet. In some embodiments, the machine scanner node pool 140 may reside in a private network of a company that includes the machines being scanned, and the console 120 may be located remotely from the node pool, outside of the company's private network. In some embodiments, the console 120 and the node pool 140 may be implemented in the same computer network, or even on the same computer device.

In some embodiments, the console 120 may be a user console (e.g. a graphical user interface or GUI), configured to receive user requests such as requests to add a new credential 110, configure system settings 112, or perform machine scans 114. In some embodiments, the console may implement a programmatic interface for communicating with other computer systems (e.g. an application programming interface (API) or service invocation interface). The console 120 may act as the controller or control plane for the scanner node pool 140.

In some embodiments, the machine scanner node pool 140 may implement a group of machine scanner nodes 150*a-f*, which are configured to perform scans on a set of machines (not shown). The machine scanner nodes 150 may be separate computing devices that implement individual instances of a scanner engine. The machine scanner nodes 150 may be selected to perform machine scans in a load-balanced manner by the console 120 or some other load balancing component of the pool. In some embodiments, each machine scanner node 150 may be implemented as a virtual machine hosted on a physical host. In some embodiments, the pool 140 of scanner nodes may be provided by a cloud-based provider network that automatically provisions instances of virtual machines to implement the scanner nodes.

As discussed, the scanner nodes may be configured to perform authenticated scans of machines, which requires authenticating the scanner node with the target machine. Depending on the target machine, a variety of access credentials can be used. For example, a machine access credential may include a user ID/password pair, an access token, an access key, a certificate associated with the scanner, and the like. In some embodiments, a credential may be configured to expire with time.

As shown in this example, request 110 adds a new credential to the node pool for scanning machines. Upon receiving request 110, the console 120 invokes a storage node manager selection component 110 to select one of the scanner nodes in the pool to act as the storage manager node 150*a*. In some embodiments, all scanner nodes in the pool may be able to perform the role of the storage manager, and they may be randomly selected to perform this role by the console 120. In some embodiments, there may be a designated subset of the pool nodes (or a single node) that can be used as the storage manager node 150*a*. In some embodiments, instead of the console 120 selecting the storage manager node, the selection decision may be left to the nodes themselves, for example, using a peer-to-peer election protocol. As shown in this example, the new credential is sent 123 to selected the storage manager node. The new credential may be transmitted over a secure communication channel or in an encrypted form to protect the credential from being seen by other entities on the network 130.

As shown, the storage manager node 150*a* implements a number of components 152, 154, and 156, which may be implemented using software on the manager node. Credential partitioning component 152 is responsible for partitioning the received credential into a number of portions 153. The partitioning process may vary based on the embodiment. In some embodiments, the partitioning will generate a number of portions 153 that is equal to the number of nodes 150 in the pool. In some embodiments, the partitioning may generate more or less portions depending on configuration information (e.g. information specified by configuration request 112) or runtime conditions (e.g. the security classification of the machine).

In some embodiments where the credential is a user ID/password pair, the partitioning may ensure that the user ID and password are segregated into two distinct portions or portion sets. In some embodiments where the credential is represented as a binary object or byte array, the partitioning may be configured to create the portions so that they do not contain continuous byte ranges of a certain size from the actual credential. For example, in some embodiments, every successive byte in the credential is assigned to a different portion, so that no two adjacent bytes are assigned to the same portion. In some embodiments, a byte array representing a credential may be shuffled or scrambled using a random process before it is partitioned into portions. These partitioning techniques are just a few of a variety of measures that may be taken to further enhance the security of credential storage in the system.

As shown, after the portions 135 are generated, they are provided to a portion assignment component 154, which assigns the portions to the nodes of the pool. In some embodiments, the portions may be assigned a in a pseudo-random or round robin fashion. In some embodiments, the assignment may be driven by configuration information, such as an assignment policy configured via the console 120. For example, in some embodiments, only a subset of scanner nodes that are designated scan a particular machine may be assigned portions of the access credential for that machine. In some embodiments, the portions are assigned so that each portion (e.g. portions 153*a* and 153*b*) is stored redundantly by more than one node in the pool (e.g. nodes 150*c-f*). In this way, loss of any one node (i.e. one copy of a portion) does not prevent the credential from being recreated using a redundant portion. In some embodiments, the redundancy level of the portions may be specified as configuration information. In an embodiment where every scanner node in the pool is used to store portions of a credential, the fraction of credential data that is stored on each node may be expressed as 1/(number of nodes)*R, where R is the redundancy level. Thus, for a pool of 10 nodes and a desired redundancy level of 3, the fraction of credential data stored by each node will be ⅒*3, or 30%. This metric may be appropriated configured based on the user's preferences for credential security and availability. In some embodiments, redundant nodes for a given portion are selected based on the nodes' individual availability characteristics, which may include their physical locations.

As shown, in some embodiments, the portion assignment component 154 may generate or update a credential storage metadata 160 for the credential. The storage metadata 160 may indicate which portions of the credential is assigned to which scanner nodes. The storage metadata may be distributed or made available to other nodes in the pool, so that the metadata can be used to obtain the portions of the credential when it needs to be reconstructed. In some embodiments, the metadata 160 may include other information, such as a checksum or hash value computed from the credential, which may later used to verify whether the credential is correctly reconstructed. The metadata 160 may also include other information such as random seeds or other data needed to reconstruct the credential.

After the portions have been assigned, the portions are distributed using a portion distribution component 156. The portions distribution module may communicate with the other nodes in the pool using a distribution protocol to ensure that the portions 153*a-b* are successfully delivered to their assigned nodes 150*c-f*. In some embodiments, the portion distribution module may wait for an acknowledgement from each of the assigned nodes 150*c-f* that individual nodes have been successfully stored. If the acknowledgment is not received, the distribution module may retry the transmission of the portion in question, or assign the portion to a different node. In some embodiments, the portion distribution module 156 may be responsible for encrypting the portions so that the transmissions are performed in a secure manner. In this example, as shown, the two portions 153*a* and 153*b* of the credential are successful distributed to the assigned scanner nodes 150*c-f*.

As shown, the console 120 in this example also implements a credential storage configuration component 124, which provides an interface to receive the configuration input 112. The configuration input 112 may specify different configuration parameters or policies that configure 125 how credentials are stored by the node pool. For example, the configuration information may specify how a credential is partitioned into portions, how the portions are assigned to the nodes, and how the portions are distributed to the nodes. In some embodiments, the configuration input may specify policies, formulas, rules, etc., that take into account runtime conditions of the system when partitioning and distributing the credential.

As shown in this example, the console 120 is also configured to receive scan requests 114, which instructs the machine scanning system 100 to select a scanner node 150*b* from the pool 140 and perform the requested scan. In this example, the console 120 implements a scanner node selection component 126 that selects the scanner node and forwards 127 the scan request to the selected node. In other embodiments, the selection may be performed by nodes 150 themselves, which may communicate amongst themselves to determine the best scanner node to performed the scan.

As shown, the selected scanner node 150*b* in this example implements components 170, 172, and 174, which may be implemented in software on the scanner node 150*b*. The portion retrieval component 170 is responsible for obtaining the portions of a needed machine access credential from other nodes in the pool. To do this, the portion retrieval component 170 will examine the credential storage metadata 160 associated with the credential, and determine which nodes to collect portions from. In this case, the credential storage metadata will indicate that nodes 150*e* and 150*f* holds the portions to needed recreate the credential. Accordingly, the portion retrieval module will request and obtain portions 153*a* and 153*b* from those nodes. If either of nodes 150*e* or 150*f* cannot provide the requested portions, the portion retriever 170 may attempt to obtain the missing portions from another node. As discussed, in some embodiments, the portions may be transmitted among the nodes in an encrypted form, and the portion retriever 170 may be responsible for decrypting the received portions.

Once the portions 153*a* and 153*b* are received, they are provided to the credential reconstruction module 172, which will recreate the credential from the portions. In some embodiments, the reconstruction may also rely on information from the credential storage metadata 160. For example, if the portions were previously generated using a process that is based on a random seed, a hash function, or encryption key, etc., the credential reconstruction module 172 will use these values to reverse the process during the reconstruction. The reconstructed credential is then used by the machine scanning module 174 to perform the requested machine scan. In the disclosed manner, the disclosed machine scanning system is able to store a large number of machine access credentials among the scanner nodes in the disclosed manner, and reconstruct the credentials when they are needed to perform machine scans. Because the credential is stored in a decentralized fashion, it cannot be compromised by a successful attack on a single node.

Figure 2:
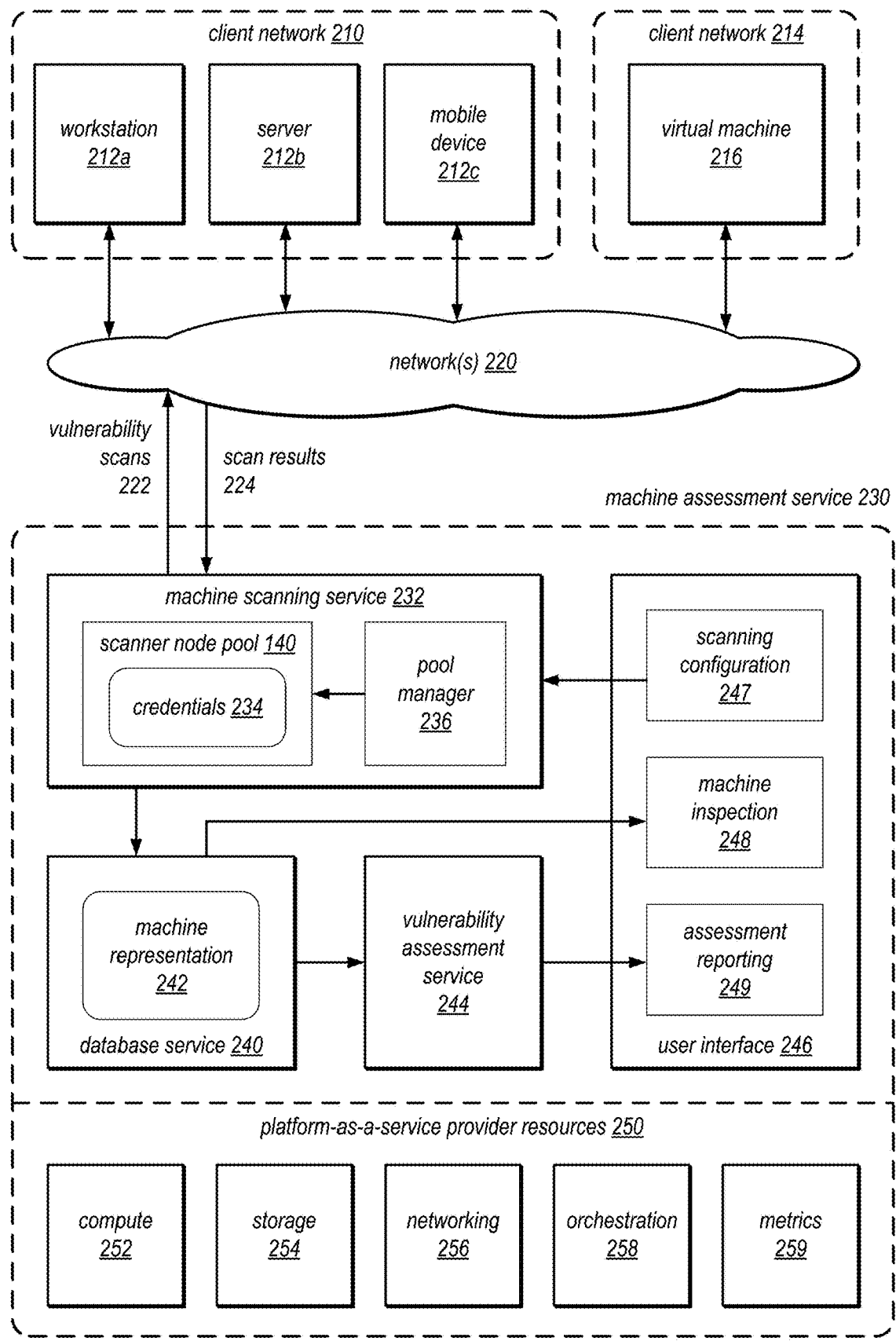
FIG. 2 illustrates a machine scanning service implemented by a platform-as-a-service provider network that provides distributed storage of machine access credentials, according to some embodiments.

FIG. 2 illustrates a machine scanning service implemented by a platform-as-a-service provider network that provides distributed storage of machine access credentials, according to some embodiments.

As shown in the figure, a machine scanning service 232 is implemented within a machine assessment service 230. The machine scanning service 232 is configured to perform scans of machines in remote client networks (e.g., client networks 210 and 214) over one or more networks 220. The client networks may be operated by different groups, organizations, companies, or other types of entities that are customers of the machine assessment service 230. In some embodiments, different clients may be associated with different user accounts of the machine assessment service 230.

In various embodiments, the network(s) 220 may encompass any suitable combination of networking hardware and protocols necessary to establish communications between the client networks 210 and 214 and the machine assessment service 230. In some embodiments, the machines 212*a-c* and 216 being scanned may execute in a private network of a company, behind a company firewall, and the network 220 may include a public network such as the Internet, which lies outside the firewall. The network 220 may encompass the different telecommunications networks and service providers that collectively implement the Internet. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, firewall/security software, etc.) for establishing networking links between the client networks 210 and 214 and the machine assessment service 230.

As shown, the client networks 210 and 214 include different types of computing resources, such as a workstation 212*a*, a server 212*b*, a mobile device 212*c*, and a virtual machine 216. Each of these types of machines may be a machine scanned by the machine scanning service 232. The virtual machine 216 may be an instance of a computer that is emulated and hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, server machines 130 may include a variety of other types of computing systems, including embedded systems, networking devices, storage devices, Internet-of-Things (IoT) devices, vehicles, and the like.

As shown, the machine scanning service 232 in this example may implement the scanner node pool 140 of FIG. 1, which is configured to store, in a decentralized fashion, machine access credentials 234. In some embodiments, the machine scanning service 232 is configured to perform security vulnerability scans 222 by collecting scan results 224 from the machines 212*a-c* and 216. In some embodiments, the machine scanning service 232 may be used to scan a large number of customer networks and store credentials 234 for a large number of machines. However, loss of credentials in such a machine scanning service is less likely because individual credentials are distributed across many nodes.

Moreover, in other embodiments, the scanner node pool 140 may be implemented within the private network of the customer, as a locally executed instance of the scanning service 232. This configuration allows the scanner node pool to manage the storage of credentials locally, without depending on an external service used by other customers. This configuration further decentralizes the storage of credentials to reduce the concentration of credentials in large repositories.

As shown, the machine scanning service 232 in this example implements a pool manager 236. In some embodiments, the pool manager 232 may be implemented within a control plane of the service 232. The pool manager may be configured to automate a variety of pool management tasks, including autoscaling the pool in response to node demand changes, monitoring health and membership information of nodes in the pool, and auto-recovering unhealthy or unresponsive nodes (e.g. by launching replacement nodes).

As shown, the machine assessment service 230 may include a number of additional services, which are implemented on of the resources 250 provided by the PaaS provider. For example, a database service 240 may be used to host a virtual representation 242 of individual client machines. In some embodiments, the machine assessment service 230 may construct a machine representation 242 for each machine that it scans. The machine representation 242 may then be used for various assessments of the machine performed by the machine assessment service. The database service 240 may be implemented on top of storage resources 254 provided by the PaaS provider. For example, the PaaS provider may provide storage in the form of a database, a file system, or a volume hosted in the cloud. In some embodiments, the storage provided by the machine assessment service 230 may be persistent storage. In some embodiments, the provided storage may not be guaranteed to be persistent. In some embodiments, the persistent storage provided by the machine assessment service 230 may be enhanced using a high-performance in-memory cache, which may be implemented on a managed cluster of compute nodes such as a REDIS cluster.

As shown, the machine assessment service 230 may implement a vulnerability assessment service 244. Vulnerability assessments of the machine may be conducted by an assessment orchestrator, which may invoke various jobs to assessment on the virtual representation 242 of the machine. The assessments may identify various security vulnerabilities of the machine based on the collected machine characteristics. For example, an assessment may detect conditions such as the existence of malware signatures, missing application patches, suspicious network traffic patterns, among other things. In some embodiments, the vulnerability assessment service 244 may observe and track these conditions over time, to determine a problematic or suspicious pattern of changes on the machine. The vulnerability assessment service 244 may then generate an assessment report that details any detected security vulnerabilities about the machine, which may be provided the machine's owners via a user interface 246.

As shown, the machine assessment service 230 may also implement a user interface 246, which may include the user console 120 of FIG. 1. The user interface 246 may be a web-based graphical or command line user interface. As shown, the user interface 246 here includes a scanning configuration interface 247, a machine inspection interface 248, and an assessment reporting interface 249. The scanning configuration interface 247 may be used to configure various aspects of the network scanning service, including aspects of how machine access credentials are stored by the scanner node pool 140. In some embodiments, the scanning configuration interface 247 may implement credential storage configuration component 124 of FIG. 1.

The machine inspection interface 248 may be used to examine the current state of a scanned machine, as reflected by the virtual representation 140 of the machine. For example, the machine inspection interface 248 may allow users to navigate through the machine's configuration data, or issue queries against the logged events of the machine. The assessment reporting interface 249 may be used to provide results of machine assessments to users. In some embodiments, the assessment reporting interface 249 may include a notification interface that pushes notifications to registered users, for example, via email or text, or to a client-side repository.

As shown, the machine assessment service 230 may be implemented within a platform-as-a-service provider network. In some embodiments, the machine assessment service 230 may be configured as a web service that receives web services requests formatted as JSON documents. The machine assessment service 230 may support REST-style or document-based (e.g., SOAP-based) types of web services requests. In some embodiments, the machine assessment service 230 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 250, which can be leased by service customers to implement custom hosted services. As shown, the PaaS provider may provide resource services such as compute resource service 252, storage resource service 254, networking resources service 256, orchestration service 258, and resource metrics service 259. The services of the machine assessment service 130 may be built using these underlying resource services provided by the PaaS provider. In some embodiments, the PaaS resources 250 may implement features such as load balancing of incoming service requests and/or dynamic management and scaling of service node pools. In some embodiments, each of the services 232, 240, 244, and 246 may be implemented using a pool of service nodes provided by the PaaS provider, which may be individual instances of virtual machines. In some embodiments, the PaaS provider may be a provider such as AMAZON WEB SERVICES or MICROSOFT AZURE.

Figure 3A:
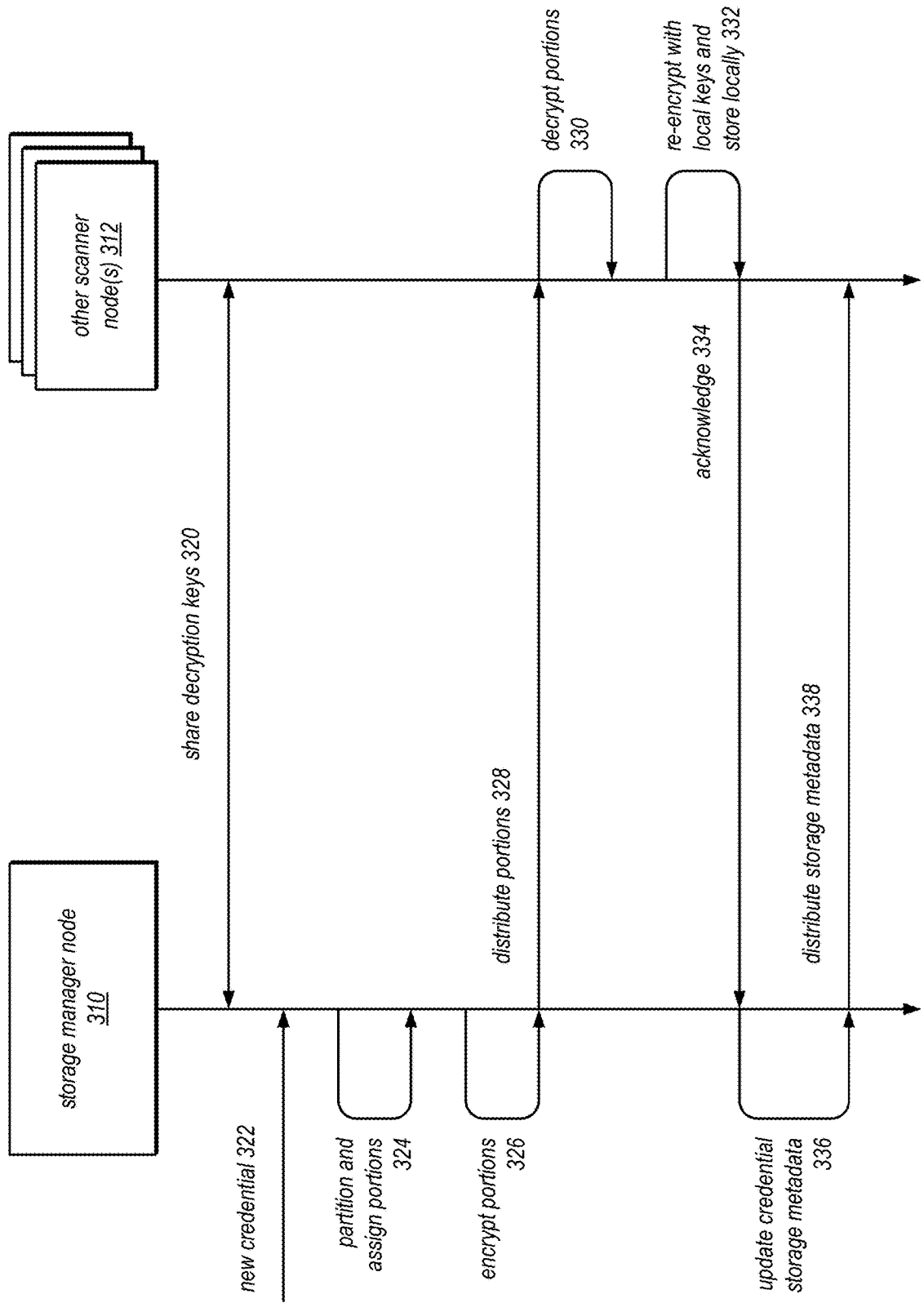
FIG. 3A illustrates interactions among a storage manager node and other nodes in a group to store a new credential in the group, according to some embodiments.

FIG. 3A illustrates interactions among a storage manager node and other nodes in a group to store a new credential in the group, according to some embodiments. In this figure, the storage manager node 310 may be storage manager 150*a* of FIG. 1, and the other scanner nodes 312 may be nodes 150*c-f* of FIG. 1.

At operation 320, nodes 310 and 312 share decryption keys that are used to securely transmit portions of credentials within the group. In some embodiments, the decryption keys may be a shared symmetrical key. In some embodiments, the decryption keys may be asymmetric keys (e.g. public/private key pairs associated with individual nodes). In some embodiments, the keys may be generated when a scanner node joins the group or pool. In some embodiments, the keys may be regenerated periodically.

At operation 322, a new credential 322 is received to be stored among the nodes. The new credential will be used to perform authenticated scans on one or more machines, and may include data such as user ID/password pairs, access keys, access tokens, certificates, and the like. The credential 322 may be received directly from the user, or another computer system such as the console 120 of FIG. 1.

At operation 324, the storage manager node 310 partitions the credential into portions and assigns the portions to the nodes in the group, which may include itself. The partitioning and assigning may be performed in similar manner as discussed for components 152 and 154 of FIG. 1. In some embodiments, the partitioning may generate a number of portions that are equal to the number of nodes in the group. In some embodiments, the assignment will cause each portion to be assigned to more than one node, so that each portion will be stored redundantly by multiple nodes.

At operation 326, the portions are encrypted. This encryption step ensures that the portions cannot be easily seen by potential bad actors observing network traffic among the nodes. In some embodiments, the encryption may be implemented at the network protocol level (e.g. using Secure Sockets Layer (SSL) or Transport Layer Security (TLS)). In some embodiments, the nodes may implement the encryption at a higher level, as part of a data sharing protocol. In some embodiments, the sender (here storage manager node 310) may encrypt the portions using its own private key and distribute 328 the portions to the other nodes, and the other nodes 312 will decrypt 330 the portions using the sender node's public key. In other embodiments, the sending node may encrypt 326 each portion using the public key of the receiving node, and the receiving node will then decrypt 330 the portion using its own private key.

At operation 332, individual ones of the other scanner nodes 312 re-encrypts their received portions of the credential with their own local keys, and stores the encrypted portions locally (e.g. on their attached storage volumes). In some embodiments, the scanner nodes 312 may not implement any local encryption, and will simply store the received portions as is.

At operation 334, the receiving nodes acknowledge 334 the successful storage of their portions. If acknowledgment is not received from an assigned scanner node, the storage manager may attempt to retry operation 328 for that node. In some embodiments, the storage manager may assign the portion to a different scanner node (e.g. if multiple retry attempts have failed for that node).

At operation 336, once all of the scanner nodes have acknowledged successful storage of their assigned portions, the storage manager node 310 generates or updates 336 a credential storage metadata, such as the credential storage metadata 160 of FIG. 1. The credential storage metadata will indicate which portions of the credential are stored by which scanner node. This metadata will be later used to gather the credential portions for reconstructing the credential. In some embodiments, the metadata will also include other data such as checksums to be used to verify the credential after reconstructions, or random seeds or decryption keys used to reconstruct the credential.

At operation 338, the credential storage metadata is distributed 338 to the other scanner nodes. Accordingly, each scanner node will have a copy of the metadata so that they all have the information needed to reconstruct the credential.

Figure 3B:
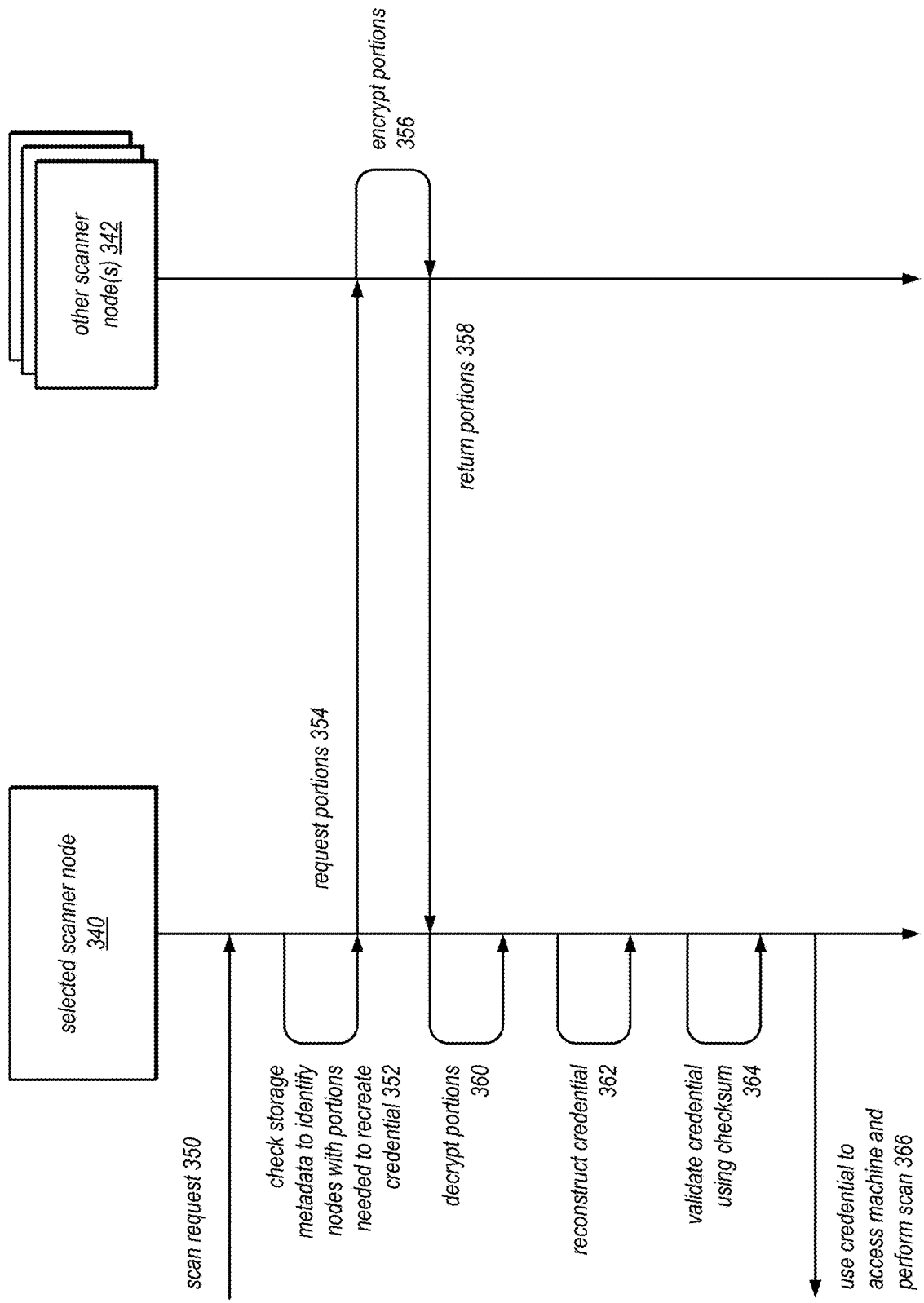
FIG. 3B illustrates interactions among a scanner node and other nodes in a group to retrieve a stored credential for performing a machine scan, according to some embodiments.

FIG. 3B illustrates interactions among a scanner node and other nodes in a group to retrieve a stored credential for performing a machine scan, according to some embodiments. In the figure, the selected scanner node 340 may be node 150b of FIG. 1, and the other scanner nodes 342 may be nodes 150c-f of FIG. 1.

At operation 350, a scan request is received by the selected scanner node 340. The scan request may be a request for an authenticated scan that involves an authentication with the target machine to be scanned. In some embodiments, the scan request may come directly from a user. In some embodiments, the scan request may come from another computer system such as the console 120 of FIG. 1.

At operation 352, scanner node 340 checks its credential storage metadata to identify nodes that have portions needed to reconstruct the access credential for the target machine. In some embodiments where the portions are stored redundantly by multiple nodes, node 340 may randomly choose one redundant node to request each portion from. At operation 354, node 340 requests the portions from the other scanner nodes 342 in the group. In some embodiments, the request may indicate a unique portion identifier that indicates which stored credential portion is being requested.

At operation 358, the scanner nodes 352 returns the requested portions. As with the initial distribution of these portions (e.g. in FIG. 3A), the portions may be encrypted 356 before they are transmitted back to the requesting node. The requesting node 340 will then decrypt 360 the portions when they are received. As in the portion distribution process, the encryption and decryption may be performed using a pair of asymmetric keys. In some embodiments, if a node 342 fails to return a portion (e.g. responds with an error message or does not respond at all), the requesting node 340 may request 354 the portion from another scanner node that is storing a redundant copy of the portion, as indicated in the credential storage metadata.

At operation 362, scanner node 340 reconstructs the credential using the received portions. The reconstruction process may be performed in similar manner as discussed for component 172 of FIG. 1. For example, the scanner node may combine the portions to create a byte array and then unscramble the byte array to obtain the original credential.

At operation 364, the scanner node 340 validates the reconstructed credential using a checksum computed previously from the credential. In some embodiments, the checksum may have been computed by the storage manager node before the credential partitioning process and distributed to scanner node 340 as part of the portion distribution process. After reconstruction of the credential, the scanner node 340 will recompute the checksum from the credential, and check if the recomputed value matches the previously computed value. If the two values match, the reconstruction is most likely correct. However, if the two values do not match, the reconstructed credential is not correct. In that case, scanner node 340 may attempt the entire reconstruction process again. After several failed attempts, scanner node 340 may report an error to the source of the scan request and indicate that it cannot successfully retrieve the credential. However, if the reconstructed credential is successfully verified, scanner node 340 will proceed to access 366 the target machine using the credential and perform the requested scan.

Figure 3C:
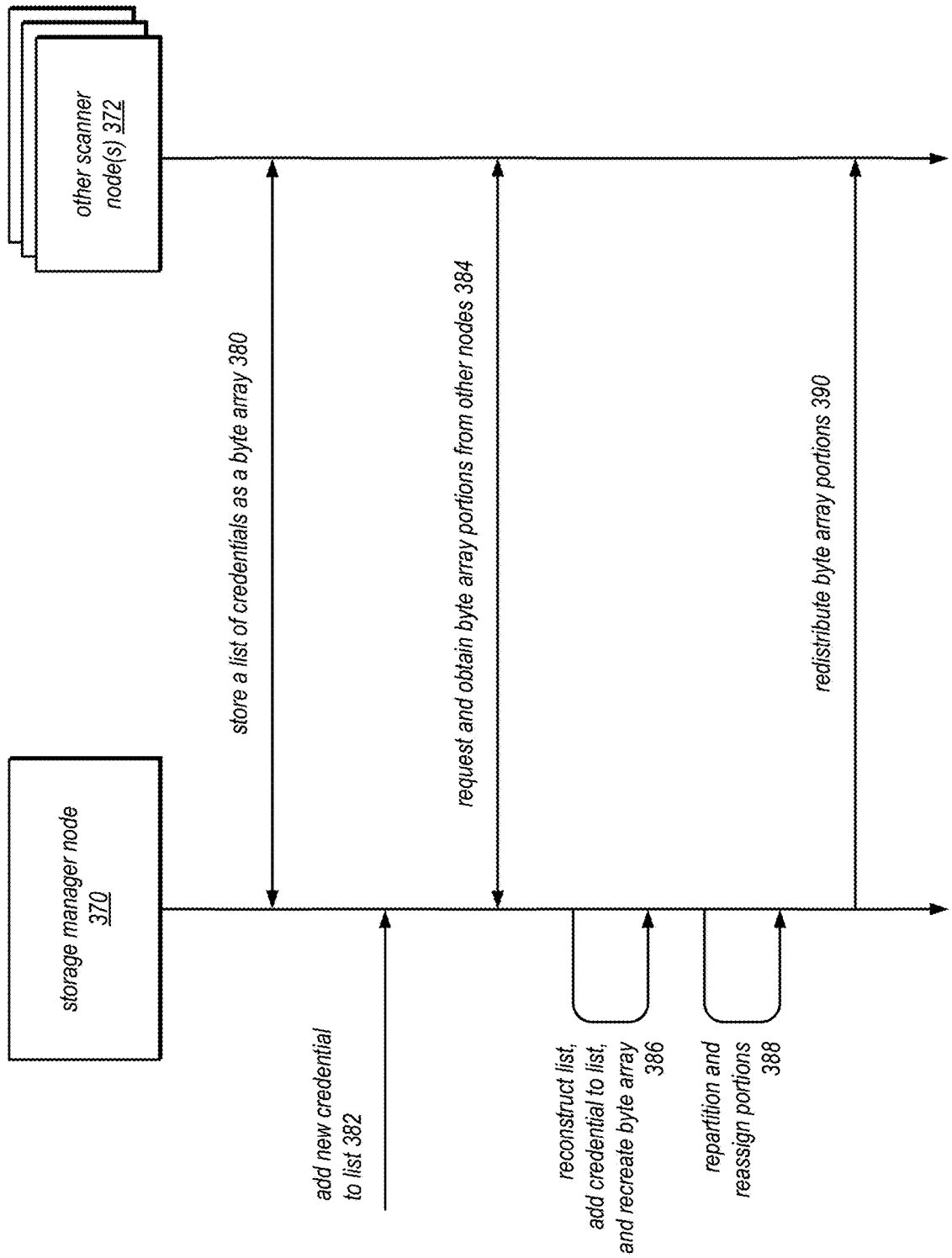
FIG. 3C illustrates interactions among a storage manager node and other nodes in a group to add a new credential to a list of credentials stored by the group as a byte array, according to some embodiments.

FIG. 3C illustrates interactions among a storage manager node and other nodes in a group to add a new credential to a list of credentials stored by the group as a byte array, according to some embodiments. In the figure, the storage manager node 370 may be node 150*a* of FIG. 1, and the other scanner nodes 372 may be nodes 150*c-f* of FIG. 1.

At operation 380, the node group stores a list of credentials together as a byte array. When credentials stored in this way, the addition of a new credential to the list will involve recreation of the current list, which is encoded by the current byte array. In some embodiments, the byte array may simply contain a concatenated list of the credentials. In some embodiments, the contents of the byte array may be shuffled, scrambled, or encrypted. Any random seeds or keys used to perform the shuffling, scrambling, or encryption may be distributed to other scanner nodes in the group to enable the other nodes to reverse the process. In some embodiments, a single byte array may be used for all machine access credentials stored by the node group. In some embodiments, the node group may divide the credentials into multiple byte arrays (e.g. a separate byte array for each target machine). The byte array will be partitioned into portions and distributed among the nodes in the group in a similar manner as discussed for individual credentials, as discussed in connection with FIG. 3A.

At operation 382, a request is received to add a new credential to the list. For example, the request may specify a new credential for a new target machine that belong to a group of machines whose credentials are stored in the list. In some embodiments, the request may be received from a computing system such as console 120.

At operation 384, the storage manager requests and obtains portions of the byte array that had been distributed among the other nodes 372 of the group. This operation may be performed in similar fashion as discussed for reconstructing individual credentials in connection with FIG. 3B.

At operation 386, the storage manager node 370 reconstructs the list by reconstructing the byte array from the received portions. In some embodiments, the recreation may involve reversing the process that was used to encode the list, as discussed in connection with operation 380. For example, the list may be recreated by reversing any shuffling, scrambling, or encryption performed during operation 380. The storage manager node 370 will then add the new credential to the list and encode the list in a new byte array with the new credential included. At operation 388, the storage manager 380 repartitions the new byte array into portions and reassigns the portions to the nodes of the group. At operation 390, the storage manager 380 redistributes the byte array portions to the assigned nodes of the group, which may be different from the assigned nodes for portions of the old byte array. Operations 386, 388, and 390 may be performed in the same way as discussed for operation 380.

Figure 4A:
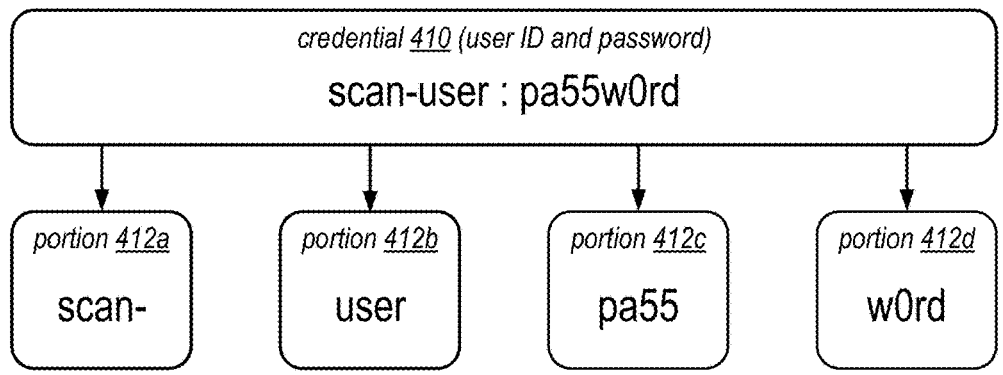
FIGS. 4A to 4C illustrate different ways of partitioning credential(s) into portions for distributed storage, according to some embodiments.
Figure 4B:
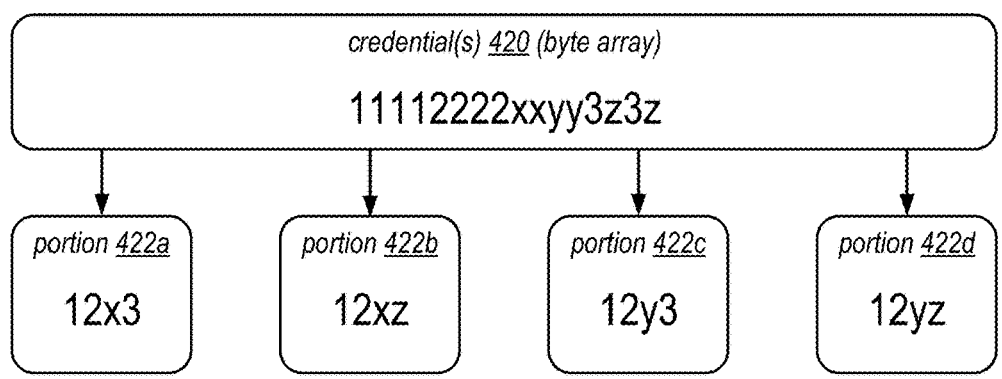
Figure 4C:
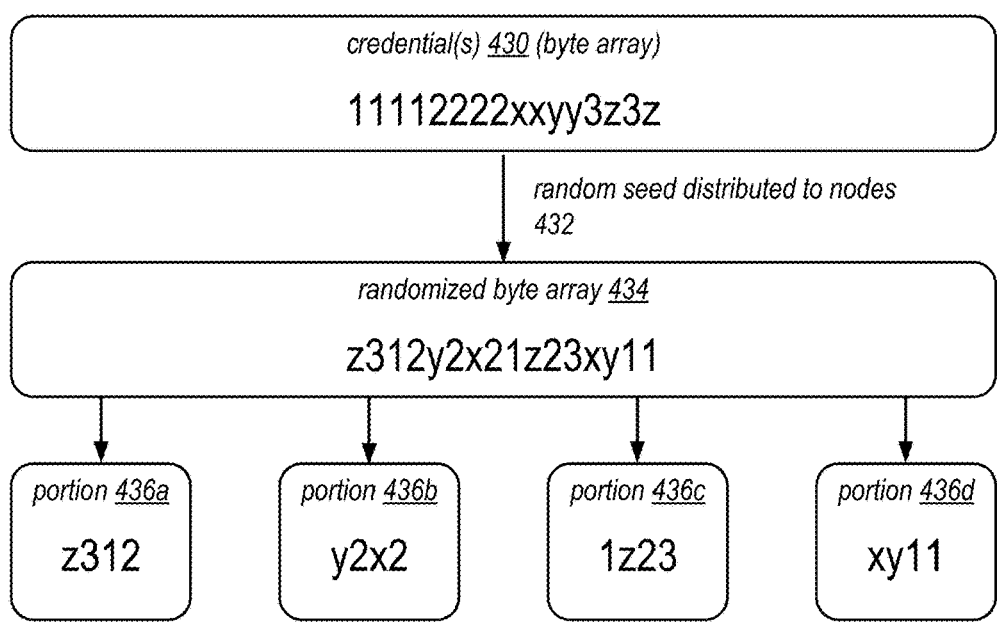

FIGS. 4A to 4C illustrate different ways of partitioning credential(s) into portions for distributed storage, according to some embodiments. The portions shown in these figures may be portions 153 of FIG. 1, and may be produced by a component such as the credential partitioning component 152 of FIG. 1.

FIG. 4A illustrates the partitioning of a credential 410 that includes a user ID and a password into four portions 412*a-d*. As shown in this example, the partitioning here is performed so that the user ID portion of the credential and the password portion of the credential are separated into distinct portions. In this manner, no one portion contains information about both the user ID and the password. This measure reduces an attacker's ability to obtain the password from information from a small number of credential portions, especially in situations where a user uses the same password for multiple credentials.

FIG. 4B illustrates the partitioning of a credential (or list of multiple credentials) 420, which has been encoded as a byte array. Byte array 420 here may be constructed in similar manner as discussed in connection with FIG. 3C. As shown in this example, the byte array 420 is partitioned into four portions or sub-arrays 422*a-d*. In this case, each byte in the byte array 420 is represented by a single character. The byte array is partitioned in a manner where each successive byte is assigned in a round-robin manner to a different one of the four portions. Thus, in this example, no portion 422 has a sequence of continuous bytes from the original byte array 420. This way of generate portions or sub-arrays enhances the security of the storage system, because continuous sets of bytes (e.g. in a password) generally reveals more information about the credential. In some embodiments, the partitioning process may be configurable to guarantee that no consecutive or continuous byte sequences of a specified size from the byte array will be retained in the generated portions.

FIG. 4C illustrates a partitioning example where a byte array 430 encoding one or more credentials is transformed into a randomized byte array 434 before it is partitioned. This is another way of enhancing the security of the storage system, as the randomization process scrambles of obfuscates the content of the original byte array 430. In some embodiments, instead of a random shuffling or scrambling of the bytes, the byte array 430 may be encrypted, so that the original bytes in the byte array are not retained in the resulting byte array. The resulting byte array (here byte array 434) is then partitioned into portions or sub-arrays 436*a-d* and distributed.

As shown in this example, a random seed 432 is used to generate the randomized byte array 434. In other embodiments, other types of seeds, parameters, keys may be used in the partitioning process (e.g. an encryption key used to encrypt the original byte array 430). These seeds, parameters, or keys may be retained and distributed to the other nodes as part of the credential storage metadata, so that the other nodes can use the seeds or keys to reversed the partitioning process, to reconstruct the original byte array 430.

Figure 5:
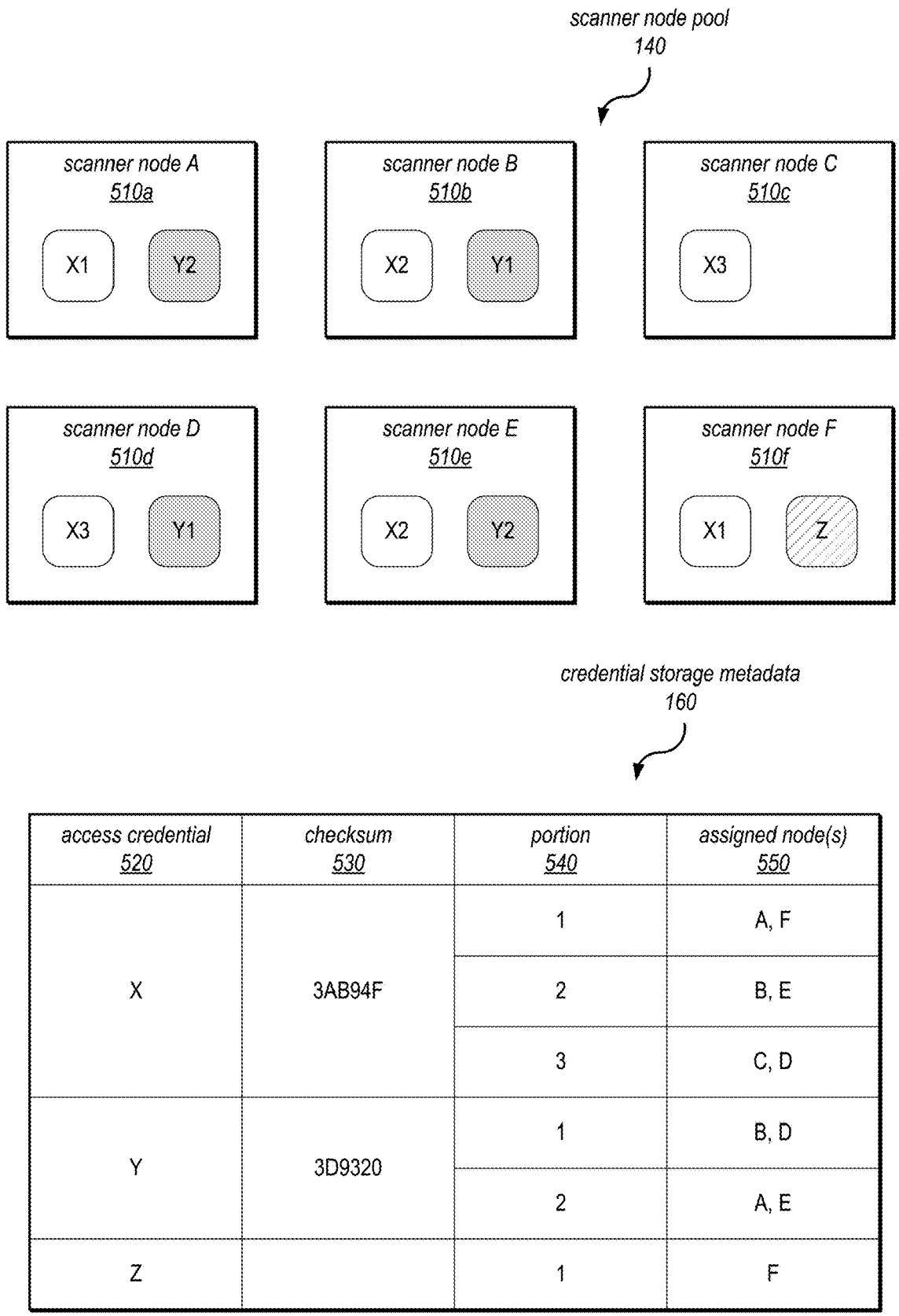
FIG. 5 illustrates an assignment of credential portions among scanner nodes to create redundant copies of the portions, according to some embodiments.

FIG. 5 illustrates an assignment of credential portions among scanner nodes to create redundant copies of the portions, according to some embodiments. The depicted assignment may be made by a component such as the portion assignment component 154 of FIG. 1.

As shown in this example, three credentials X, Y, and Z, are stored in the scanner node pool 140, which includes six nodes 510*a-f*. As indicated by an example of the credential storage metadata 160 at the bottom of the figure, credential Z is not distributed across multiple scanner nodes. Rather it is scored as is on a single scanner node F. In some embodiments, the machine scanning system may allow users to configure how each individual credential should be stored, including whether to partition the credential, and if so, how the credential should be partitioned and distributed.

In this example, the credential storage metadata includes four fields. Field 520 specifies the access credential. In this example, the storage metadata for all three credentials X, Y, and Z are all stored as part of the same data structure. Field 530 indicates a checksum for those credentials that were partitioned and therefore needs to be reconstructed. As discussed, this information is distributed to the nodes in the pool so that when a node reconstructs the credential, it can use the checksum to verify whether the reconstructed credential is correct. Fields 540 and 550 provides a mapping that indicates which portions are stored by which nodes. In some embodiments, each portion may be associated with a unique portion ID, such as a sequence number, which is stored in field 540. The nodes assigned to store each portion of the credential is stored in field 550.

As shown in this example, the portions for both credentials X and Y are stored redundantly on multiple nodes. This redundant storage of portions improves the availability of the credential, so that it can be reconstructed even when one or more nodes goes offline. In some embodiments, the redundancy level of the portions may be specified by user configuration. In some embodiments, the portion assignment process may assign nodes so that each portion is stored by at least two nodes. In some embodiments, the nodes that are selected to store redundant copies of a portion may be selected based on their distinct availability characteristics. For example, two nodes may be selected to store redundant copies of a portion based on the fact that they are located in different geographical locations or availability zones, or that they use different backup power sources. However, under some configurations, portions of some credentials may not be stored redundantly. Under these configurations, the portion assignment scheme may ensure that no scanner node stores more than one portion of the credential.

FIG. 6 illustrates an example graphical user interface (GUI) that allows a user to configure aspects of distributed storage of credentials in a machine scanning system, according to some embodiments. In some embodiments, the GUI 600 shown in the figure may be part of the credential storage configuration component 124 of FIG. 1, or the user interface 246 of FIG. 2.

As shown, the GUI 600 allows a user to specify configuration settings for how scanning credentials are stored. In this example, the scanning credentials are credentials for accessing two machines, shown in section 610. The credential list for the two machines may be viewed or modified by clicking on the link shown in section 620.

Section 630 indicates that the credential in question should be partitioned and distributed across a group of scanner nodes (e.g. the group of scanner nodes responsible for scanning the two machines). Section 630 provides a number of controls to modify configuration parameters that govern how the partitioning should occur. As shown in this example, the configuration information specifies that the credentials will be partitioned into a number of portions that is equal to the number of scanner nodes in the group. In some embodiments, a repartitioning of the credentials will be triggered when a node joins or leaves the pool. Section 630 also offers a configuration option to shuffle or scramble the byte array that encodes the credentials (e.g. byte array 420 or 430) before the partitioning. Section 630 also provides the option of storing the portions of the credentials redundantly on a specified number of nodes. These configuration parameters may be adjusted to achieve the desired security or availability characteristics for storing the credentials.

As shown, section 640 provides a number of configuration parameters for the automatic repartitioning of the credentials. In this example, the credentials will be repartitioned when membership of the scanner node group changes. In some embodiments, the scanner nodes may be configured to monitor each other using a peer-to-peer protocol (e.g. to monitor heartbeats of the nodes). When one node is detected to be impaired or unavailable, a credential repartitioning process will be initiated. Section 640 also provides a configuration option to allow the credentials to be repartitioned periodically (e.g. according to a set schedule). It is noted, however, that frequent repartitioning may actually undermine the security of the credentials, as it allows individual scanner nodes to receive more information about the credential over time. Section 640 in this example also includes a configuration parameter that allows the credential to be repartitioned upon the detection of certain specified events (e.g. detection of an abnormal access of the target machine). Automatic repartitioning may increase the security or availability of the stored credentials, in some situations. Finally, section 640 in this example also provides a button 642 that allows the user to manually initiate a repartitioning of the credentials. Manual repartitioning may be performed at any time that is convenient for the user (e.g., when the scanner nodes are in a safe mode and air gapped from the rest of the network).

Figure 7:
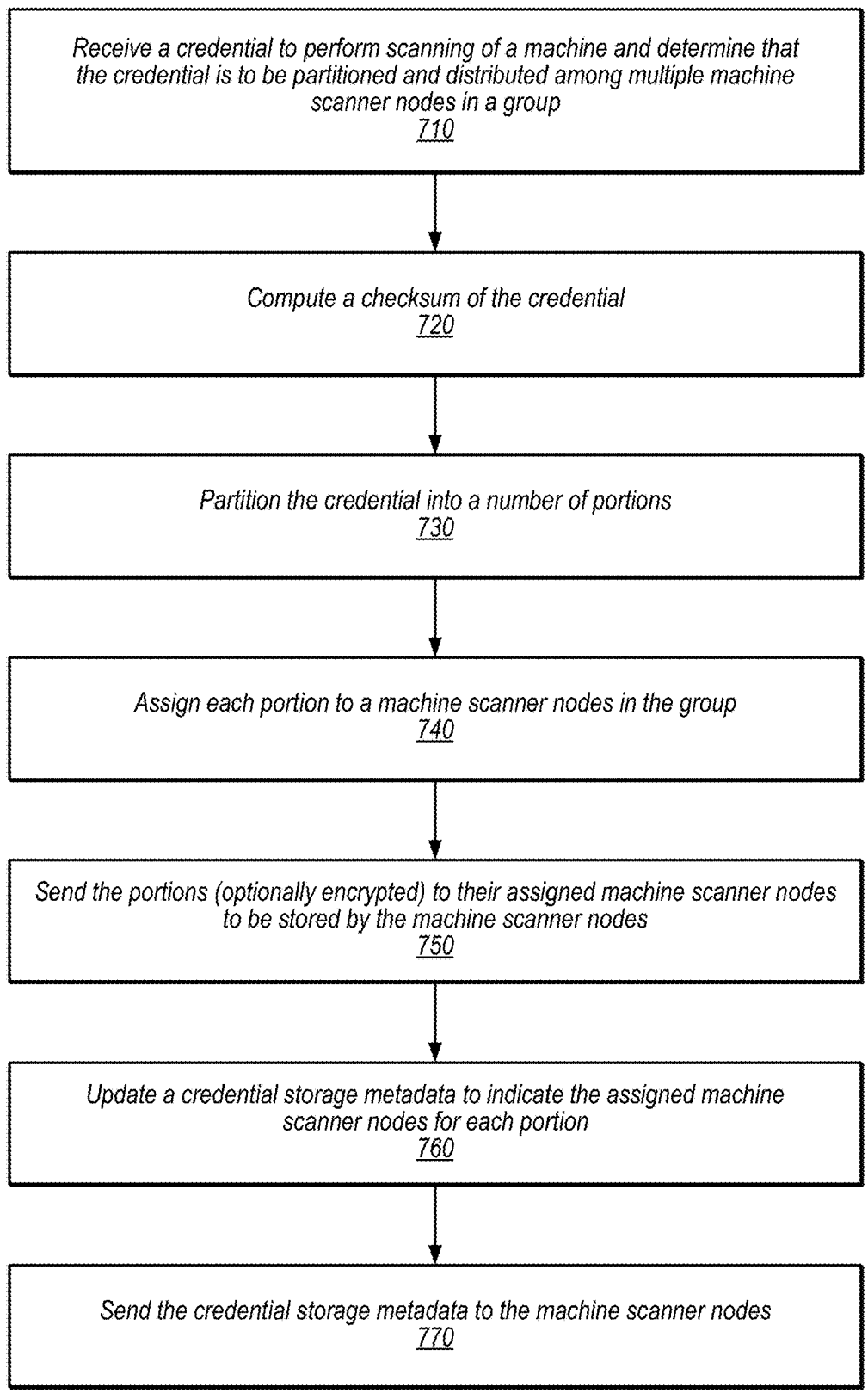
FIG. 7 is a flowchart that illustrates a process of storing a credential in a machine scanning system that implements distribute storage of credentials, according to some embodiments.

FIG. 7 is a flowchart that illustrates a process of storing a credential in a machine scanning system that implements distribute storage of credentials, according to some embodiments. The process shown here may be performed by the storage manager node 150*a* of FIG. 1.

The process begins at operation 710, where a credential for scanning a machine is received. The credential may be data such as a user ID/password pair, an access key, an access token, a certificate, etc. The credential may be sent by the user console 120 of FIG. 1, and received by the storage manager node, which may be dynamically selected from a group of scanner nodes. The storage manager node is selected to coordinate storage of the credential within the group. In some embodiments, a credential may be received with information (e.g. configuration information or request parameters) indicating how the credential should be stored. The storage manager node may determine based on such information that the credential should be partitioned into portions and distributed among the group of scanner nodes.

At operation 720, a checksum of the credential is computed. In some embodiments, instead of a checksum, another type of encoding or representative value of the credential may be used, such as a hash, signature, or some other encoding whose value is generated from the credential. In some embodiments, the checksum (or other encoding or representative value) will be distributed to the other nodes of the group, so that when the credential is later reconstructed from the portions, its contents can be verified using such value.

At operation 730, the credential is partitioned into a number of portions. The partitioning may be performed by a component such as the credential partitioning component 152 of FIG. 1. In some embodiments, the partitioning process may be controlled by configuration data, such as configuration input 112. In some embodiments, the partitioning may generate a number of portions equal to the number of scanner nodes in the group. In some embodiments, the partitioning process may guarantee that a user ID and a password in the credential are separated into distinct portions. In some embodiments, the partitioning may be performed on a byte array that encodes multiple credentials. In some embodiments, the partitioning may produce byte array portions that contain no continuous bytes from the original byte array. In some embodiments, the storage manager node may randomly shuffle or scramble the bytes in the byte array or encrypt the byte array before the byte array is partitioned.

At operation 740, the portions produced by the partitioning is assigned to individual scanner nodes in the group. The assignment may be performed by a component such as the portion assignment component 154 of FIG. 1. The assignment may be performed according to configuration information such as configuration input 112. In some embodiments, the assignment process may assign each portion to a different scanner node. In some embodiments, a portion may be assigned to multiple scanner nodes, to be stored redundantly by the multiple nodes.

At operation 750, the portions are sent to their assigned machine scanner nodes to be stored by the assigned nodes. The sending may be performed by a component such as the portion distribution component 156 of FIG. 1. In some embodiments, scanner nodes in the group may each possess knowledge about the other member nodes of the group and be able to communicate with the other members. In some embodiments, the sending node (e.g. the storage manager node) will first encrypt a portion before sending the portion to a receiving node. The encryption may be performed as part of a communication protocol implemented by the scanner nodes. In some embodiments, the encryption and decryption may be performed using a pair of asymmetric keys. For example, the encryption may be performed using a private key of the sending node, or a public key of the receiving node.

At operation 760, a credential storage metadata is updated (or created) or indicate the assigned machine scanner nodes for each portion of the credential. The credential storage metadata (e.g. metadata 160 of FIG. 1) may be created after all scanner nodes have acknowledged that their assigned portion has been successfully stored. In some embodiments, the credential storage metadata may include other data, such as the checksum discussed in connection with operation 720, or a random seed or key used during the partitioning process, as discussed in connection with FIG. 4C. The credential storage metadata may be used to reconstruct the credential when it is need for a scan of a machine.

At operation 770, the credential storage metadata is distributed to the scanner nodes in the group. In this manner, any scanner node in the group will be able to recreate the credential, when it is called upon to perform a machine scan using the credential. In some embodiments, the credential storage metadata may also be encrypted before it is transmitted, using the same encryption process used for the credential portions. In some embodiments, information in the credential storage metadata may be viewed via a user interface (e.g. the console 120) to provide information about the storage of credentials.

Figure 8:
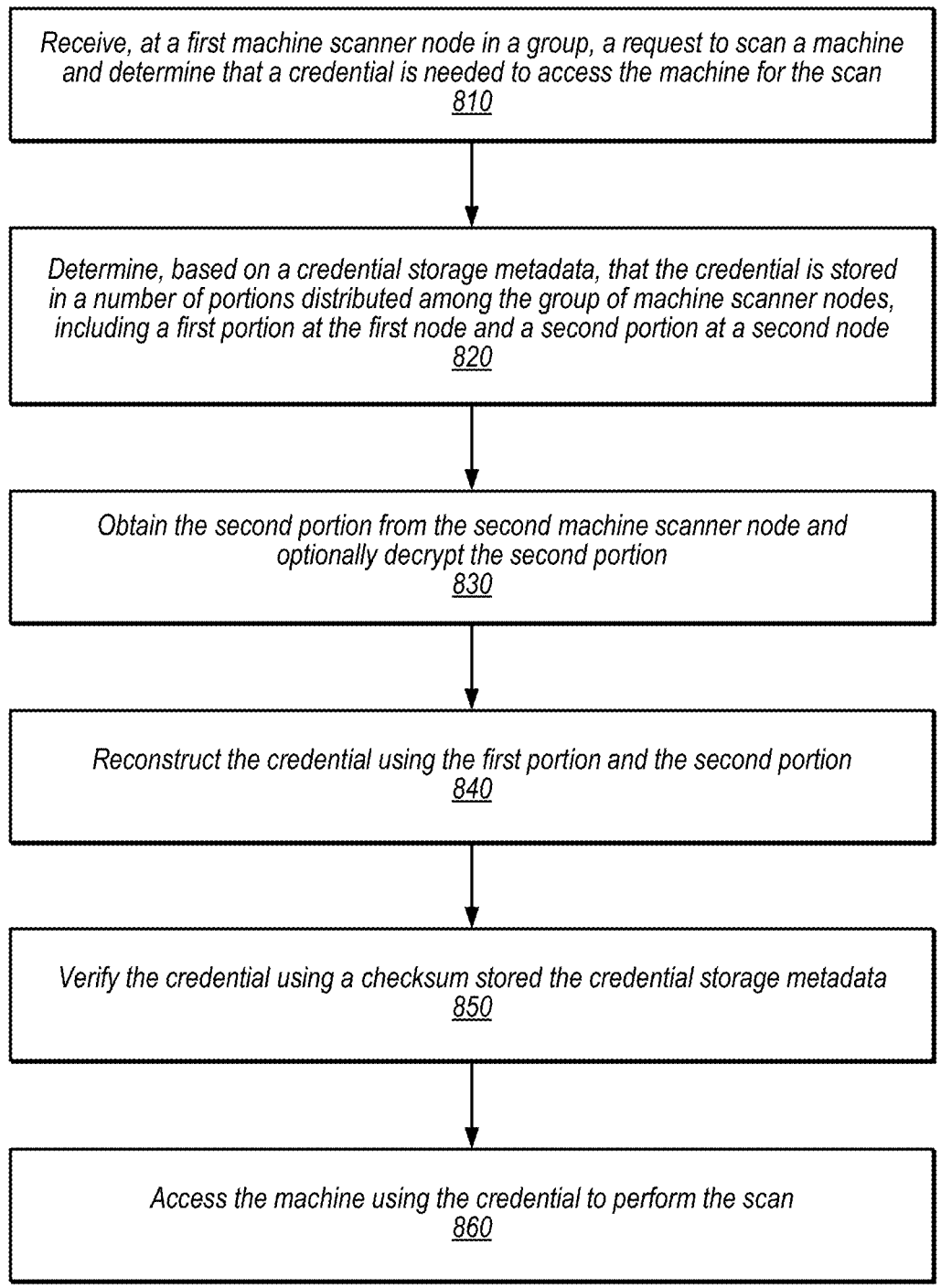
FIG. 8 is a flowchart that illustrates a process of reconstructing a credential in a machine scanning system that implements distribute storage of credentials, according to some embodiments.

FIG. 8 is a flowchart that illustrates a process of reconstructing a credential in a machine scanning system that implements distribute storage of credentials, according to some embodiments. The process depicted in the figure may be performed by a machine scanner node such as node 150b of FIG. 1.

At operation 810, a request to scan a machine is received at a first machine scanner node of a group. The group of scanner nodes may be the machine scanner node pool 140 of FIG. 1. In some embodiments, the first machine scanner node may be selected by a console 120 or a load balancer to perform the scan based on runtime conditions (e.g. current workload) of the other nodes in the pool. The first machine scanner node may determine that the scan requires a credential of the target machine to perform the requested scan.

At operation 820, the first machine scanner node determines that the credential is stored in a number of portions distributed among the group of machine scanner nodes. The portions (e.g. portions 153 of FIG. 1) may include a first portion that is stored locally at the first node and a second portion stored by a second node. In some embodiments, this determination may be made based on credential storage metadata (e.g. metadata 160) associated with the credential.

At operation 830, the first machine scanner node obtains the second portion of the credential from the machine scanner node and optionally decrypts the second portion. In some embodiments, this operation may be performed by a component such as the portion retrieval component 170 of FIG. 1, which may be configured to retrieve all needed portions to reconstruct the credential from the scanner nodes in the group. If the received portions are provided in an encrypted form, the receiving node (here the first machine scanner node) will decrypt the portions. In some embodiments, the decryption may be performed using a decryption key that is part of a pair of asymmetric keys.

At operation 840, the credential is reconstructed using the first and second portions, along with any other portions of the credential retrieved from other scanner nodes in the group. In some embodiments, operation 840 may be performed by the credential reconstruction component 172 of FIG. 1. The reconstruction may be performed by recombining all of the retrieved portions. Additionally, any shuffling or encryptions performed on the recreated byte array may be reversed using data (random seeds, encryption keys, etc.) credential storage metadata.

At operation 850, the credential is verified using a checksum or some other representative value stored in the credential storage metadata. In some embodiments, a new checksum or representative value is computed from the reconstructed credential, and that new checksum or representative value is compared to the original checksum or representative value previously computed (e.g. by the storage manager node). If the two values are a match, the verification may be deemed a success. If the two values do not match, the verification is a failure, and the first node may repeat the credential reconstruction process another time. In some embodiments, after a number of failed reconstruction attempts, the first node will report an error to the requesting system that it is unable to retrieve the access credential for the target machine.

At operation 860, after the credential is verified, the first machine scanner node will access the target machine using the credential to perform the scan. In some embodiments, operation 860 may be performed by the machine scanning component 174 of FIG. 1.

Figure 9:
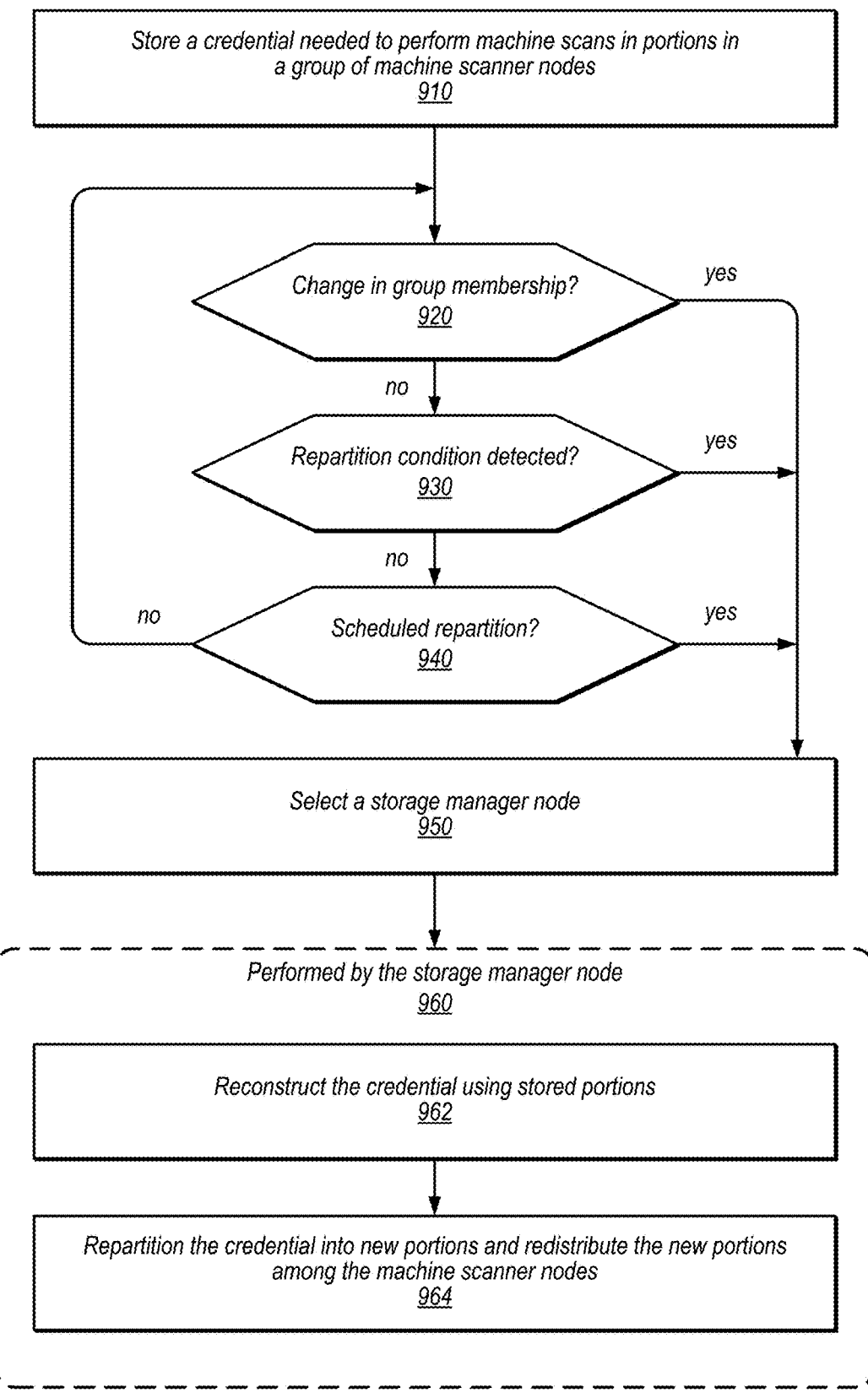
FIG. 9 is a flowchart that illustrates a process of repartitioning a credential in a machine scanning system that implements distribute storage of credentials, according to some embodiments.

FIG. 9 is a flowchart that illustrates a process of repartitioning a credential in a machine scanning system that implements distribute storage of credentials, according to some embodiments. The depicted process may be performed by an embodiment of the machine scanning system 100 of FIG. 1.

At operation 910, a credential needed to perform machines scans on a target machine is stored in a group of machine scanner nodes. The storage of the credential may be performed in a decentralized manner, as discussed in connection with FIG. 7, so that individual scanner nodes will only store some but not all portion of the credential.

As shown in this example, once the credential has been stored in this decentralized fashion, the process continuously loops through operations 920, 930, and 940 to monitor for repartition conditions. This monitoring may occur automatically within the machine scanning system to watch for repartition conditions for the credential, without human intervention.

At operation 920, a repartition of the credential will be initiated if a change in scanner node group membership is detected. In some embodiments, the group of machine scanner nodes may be configured to monitor each other to continuously check whether all of the members are still online and functioning properly. If a node goes offline or is not functioning properly, the credential portions stored on that node may no longer be available. Also, in some embodiments, loss of a node may cause a violation of storage configuration rules for a credential (e.g. cause a credential portion to fail to meet a specified redundancy requirement). In some embodiments, when a new node joins the group, a repartition may also be triggered so that the new node can take part in the decentralized storage of credentials. In this manner, the security of the credential is automatically increased.

At operation 930, if another type of repartition condition is detected, a repartition of the credential will be initiated. In some embodiments, the monitoring of these repartition conditions may be implemented by the group of scanner nodes, the machine scanning system, or specified by the user via configuration. For example, in some embodiments, a repartition may be triggered if there is a confirmed or suspected compromise of one of the target machines subject to machine scans. In some embodiments, a restart of the scanner node pool may also trigger a repartition of the credentials. As one more example, a repartition may be triggered when one of the scanner nodes is suspected to have been compromised.

At operation 940, a repartition will be initiated if it is specified in a repartition schedule. In some embodiments, the credentials may be repartitioned and redistributed based on a regular schedule, for example, once a month. The schedule may be set via a configuration interface such as the console 120, and may be set differently for individual credential or credential groups. It is noted however that frequent repartitions may actually reduce the security of the stored credential, because it exposes the scanner nodes to more information about the credential (e.g. different portions) over time. In some embodiments, periodic repartitioning may be performed in conjunction with other security measures, for example, changing the encryption or scrambling the credential before each repartitioning.

At operation 950, when a repartition of the credential is triggered, a storage manage node is selected. In some embodiments, each repartitioning of the credential will cause a new storage manager node (e.g. storage manager node 150a) to be selected to coordinate the repartition process. In some embodiments, the selection may be performed by an outside control plane component such as the console 120. In some embodiments, the nodes in the group may elect a manager node for the repartitioning based on an election protocol.

As shown, operations 962 and 964 are performed 960 by the newly selected storage manager node. At operation 962, the storage manager node reconstructs the credential using the currently store portions. Operation 962 may be performed in similar manner as the credential reconstruction process discussed connection with FIG. 8. At operation 964, the reconstructed credential is repartitioned into new portions, and redistributed among the machine scanner nodes. Operation 964 may be performed in a similar manner as discussed in connection with the process discussed in connection with FIG. 7. Operation 964 will cause the credential to be stored among the scanner nodes in a different way than the storage operation of operation 910. The described repartitioning process may be useful to thwart certain types of in-progress attacks from gaining access to the full credential.

Figure 10:
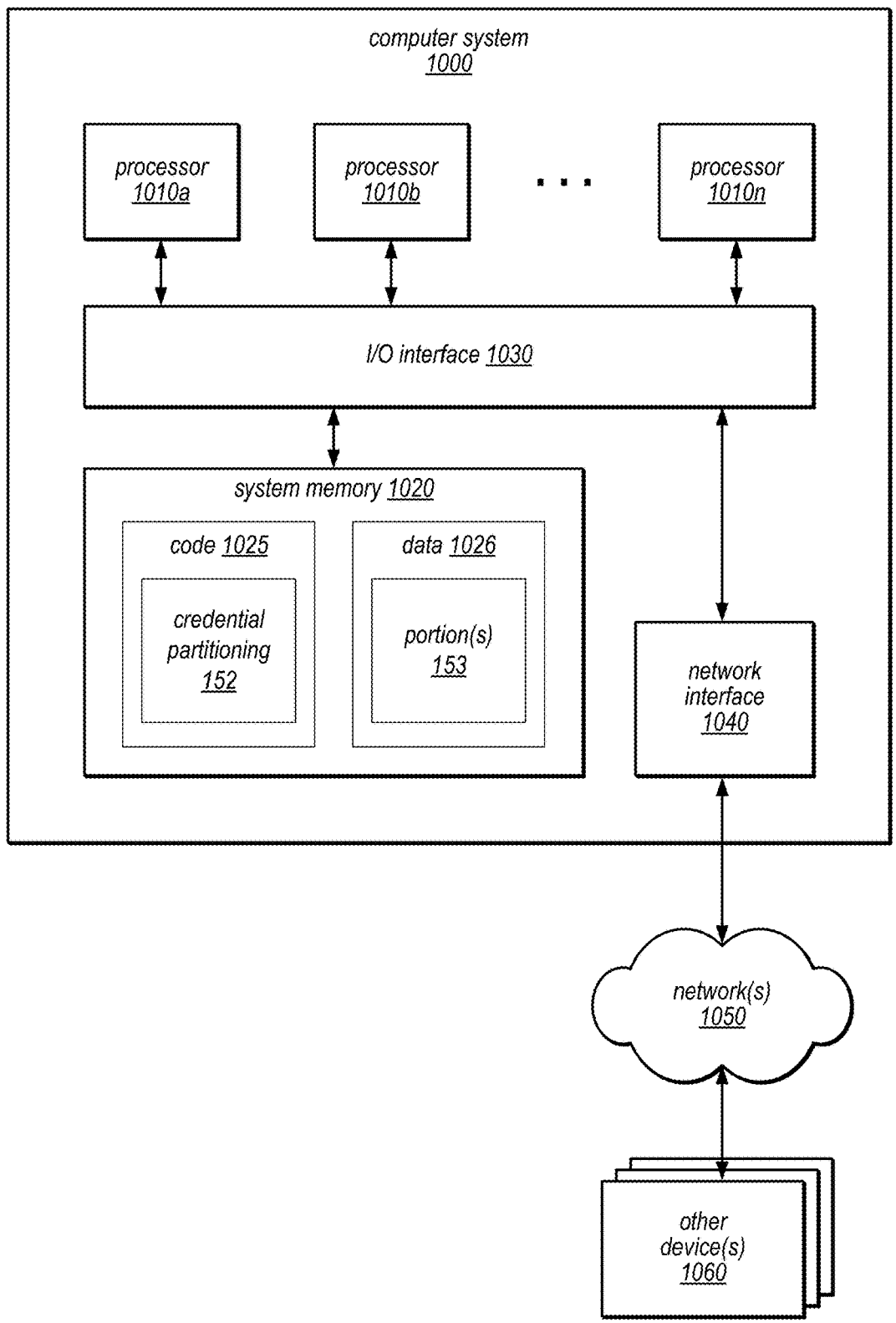
FIG. 10 is a block diagram illustrating an example computer system that is used to implement one or more portions of a machine scanning system that implements distribute storage of credentials, according to some embodiments.

FIG. 10 is a block diagram illustrating an example computer system that is used to implement one or more portions of a machine scanning system that implements distribute storage of credentials, according to some embodiments. For example, the computer system 1000 may be a server that implements one or more components of machine scanning system 100 of FIG. 1 or the machine scanning service 232 of FIG. 2.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the credential partitioning component 152, as discussed. The system memory 1020 may also be used to store data 1026 needed or produced by the executable instructions. For example, the in-memory data 1026 may include portions of the credential portions 153, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
    one or more hardware processors with associated memory that implement a machine scanning system that implements a group of machine scanner nodes of, including a first machine scanner node configured to:
        receive a credential to perform a scan of a machine and determine that the credential is to be partitioned and distributed among multiple machine scanner nodes in the group;
        partition the credential into a plurality of portions;
        assign individual ones of the portions to respective ones of the machine scanner nodes in the group;
        send the portions to their assigned machine scanner nodes to be stored by the assigned machine scanner nodes; and
        update a credential storage metadata to indicate the assigned machine scanner nodes for individual ones of the portions, wherein the individual ones of the assigned machine scanner nodes are configured to use the credential storage metadata to reconstruct the credential.

2. The system of claim 1, wherein the first machine scanner node is configured to send the credential storage metadata to the assigned machine scanner nodes.

3. The system of claim 1, wherein the first machine scanner node is configured to:
    compute a checksum of the credential and include the checksum in the credential storage metadata, wherein individual ones of the assigned machine scanner nodes are configured to verify the credential after the reconstruction using the checksum.

4. The system of claim 1, wherein a first one of the assigned machine scanner nodes is configured to:
    receive a request to perform a scan of the machine;
    determine, based on a credential storage metadata, that a portion of the credential is stored at a second one of the assigned machine scanner nodes;
    obtain the portion from the second assigned machine scanner node;
    reconstruct the credential using the portion; and
    access the machine using the credential to perform the scan of the machine.

5. The system of claim 1, wherein:
    the second assigned machine scanner node is configured to store the portion of the credential in an encrypted form; and
    the first assigned machine scanner node is configured to decrypt the portion after obtaining the portion.

6. The system of claim 1, wherein the machine scanning system is configured to receive a distribution policy via a configuration interface, wherein the portions of the credential are assigned according to the distribution policy.

7. The system of claim 6, wherein the distribution policy specifies a number of portions that the credential is to be partitioned into.

8. The system of claim 6, wherein the distribution policy specifies that no machine scanner node in the group is assigned more than one portion of the credential.

9. The system of claim 6, wherein the distribution policy specifies that each of the portions is assigned redundantly to at least two machine scanner nodes in the group.

10. The system of claim 6, wherein the distribution policy specifies to reassign the portions periodically.

11. The system of claim 6, wherein the distribution policy specifies to reassign the portions of the credential in response to a membership change of the group.

12. The system of claim 6, wherein the distribution policy specifies to reassign the portions of the credential in response to detection of an abnormal access to the machine.

13. The system of claim 6, wherein the distribution policy specifies to reassign the portions of the credential in response to a membership change of the group.

14. A method, performed by one or more hardware processors with associated memory that implement a machine scanning system of a group of machine scanner nodes, the method comprising:
- receiving a credential to perform a scan of a machine and determining that the credential is to be partitioned and distributed among multiple machine scanner nodes in the group;
- partitioning the credential into a plurality of portions;
- assigning individual ones of the portions to respective ones of the machine scanner nodes in the group;
- sending the portions to their assigned machine scanner nodes to be stored by the assigned machine scanner nodes; and
- updating a credential storage metadata to indicate the assigned machine scanner nodes for individual ones of the portions, wherein the individual ones of the assigned machine scanner nodes are configured to use the credential storage metadata to reconstruct the credential.

15. The method of claim 14, further comprising sending the credential storage metadata to the assigned machine scanner nodes.

16. The method of claim 14, furthering comprising receiving a distribution policy via a configuration interface of the machine scanning system, wherein the portions of the credential are assigned according to the distribution policy.

17. The method of claim 16, wherein the distribution policy specifies that the assignment is to be performed based on one or more availability characteristics of the machine scanner nodes.

18. The method of claim 16, wherein the distribution policy specifies that no machine scanner node in the group is assigned more than one portion of the credential.

19. The method of claim 16, wherein the distribution policy specifies that each of the portions of the credential is assigned redundantly to at least two machine scanner nodes in the group.

20. One or more non-transitory computer-accessible storage media storing program instructions that when executed on or across one or more processors implement at least a portion of a machine scanning system, wherein the machine scanning system implements a group of machine scanner nodes, and the program instructions cause machine scanning system to:
- receive a credential to perform a scan of a machine and determine that the credential is to be partitioned and distributed among multiple machine scanner nodes in the group;
- partition the credential into a plurality of portions;
- assign individual ones of the portions to respective ones of the machine scanner nodes in the group;
- send the portions to their assigned machine scanner nodes to be stored by the assigned machine scanner nodes; and
- update a credential storage metadata to indicate the assigned machine scanner nodes for individual ones of the portions, wherein the individual ones of the assigned machine scanner nodes are configured to use the credential storage metadata to reconstruct the credential.

* * * * *